R. F. MASSA.
STUFFING BOX.
APPLICATION FILED NOV. 20, 1918.

1,425,268.

Patented Aug. 8, 1922.
2 SHEETS—SHEET 2.

INVENTOR
Robert F. Massa,
BY
H. S. MacKay.
ATTORNEY

UNITED STATES PATENT OFFICE.

ROBERT F. MASSA, OF NEW YORK, N. Y.

STUFFING BOX.

1,425,268.   Specification of Letters Patent.   Patented Aug. 8, 1922.

Application filed November 20, 1918. Serial No. 263,274.

*To all whom it may concern:*

Be it known that I, ROBERT F. MASSA, a citizen of the United States, residing at New York city, in the county of New York and State of New York, have invented certain new and useful Improvements in Stuffing Boxes; and I do hereby declare the following to be a full, clear, and exact description of the invention, such as will enable others skilled in the art to which it appertains to make and use the same.

My present invention relates to means whereby power may be transmitted through the wall of a container or casing within which the fluid pressure is considerably superior to that existing outside of the container, and whereby this is accomplished with practically no loss or leakage through the opening which accommodates the transmission shaft. My improvement is especially useful in certain types of refrigerating machinery, wherein it is desirable to drive a pump within a chamber to which the refrigerant is admitted, and in this connection my invention supplies means whereby the pump in question may be driven from without, while preventing the refrigerant from leaking, and at the same time supply ing adequate lubrication.

Among the useful objects accomplished by use of my invention are the following:—A stuffing box is provided wherein all possibility of leakage is prevented both along the surface of the transmission shaft and along the outer part of the stuffing box; means are provided for making it possible to repack the stuffing box without material leakage, by use of an auxiliary stuffing box; the transmitting shaft is kept lubricated by lubricant always in direct contact with the stuffing box and so arranged that the lubricant would be forced out of the stuffing box before any refrigerant or other contents of the container could reach it; the construction is such that all strains other than pure torque are kept away from the transmitting shaft and its bearings; the stuffing box takes up its own wear and no adjustment is either necessary or admissible from without; the stuffing box and associated bearings are arranged so that they can all be conveniently and quickly removed as one so that they can be taken to a shop when thorough overhauling is required, rendering it unnecessary to overhaul in loco. Further objects and advantages of the invention will appear in the following description.

Figure 1:
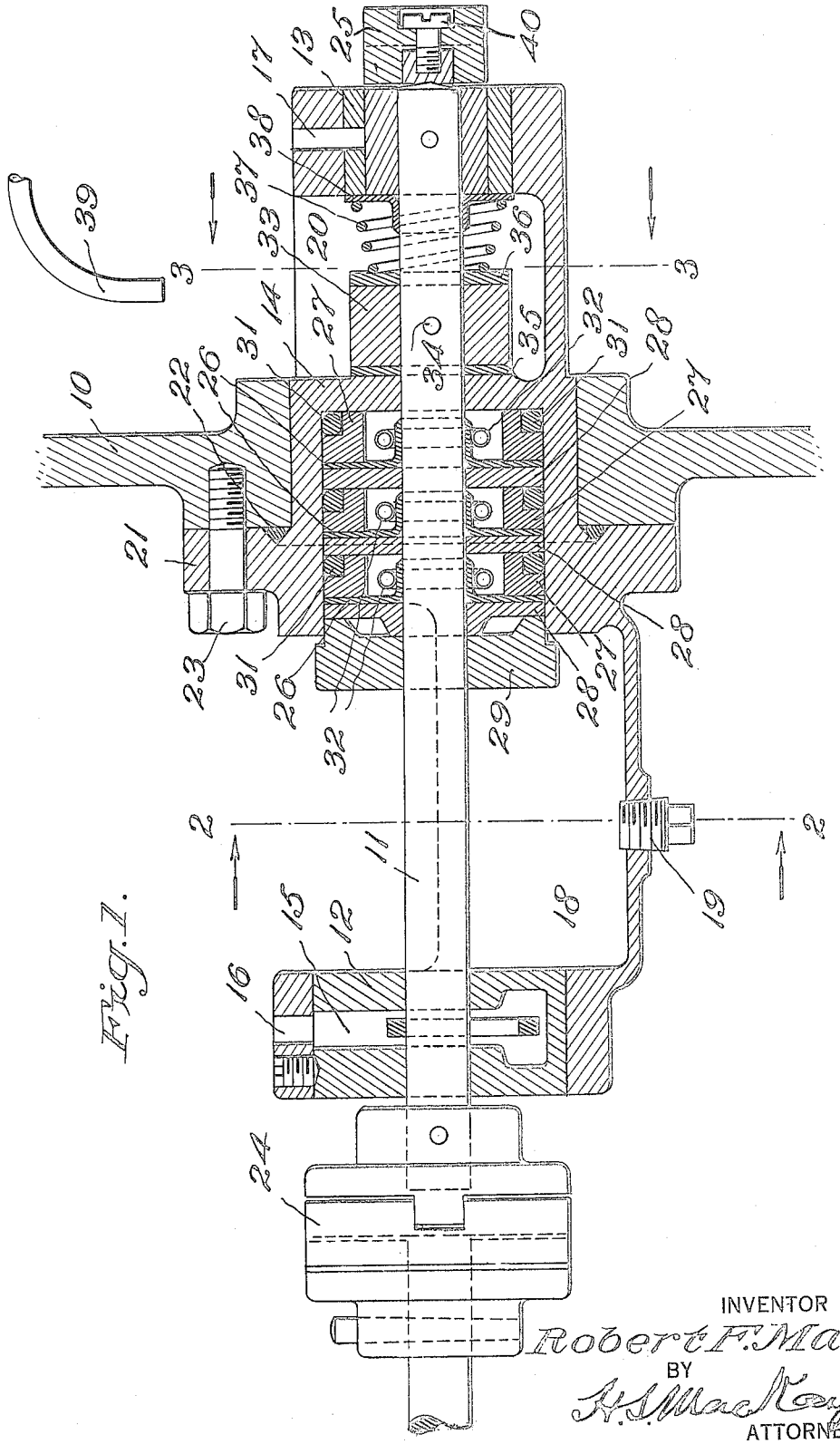
Figure 2:
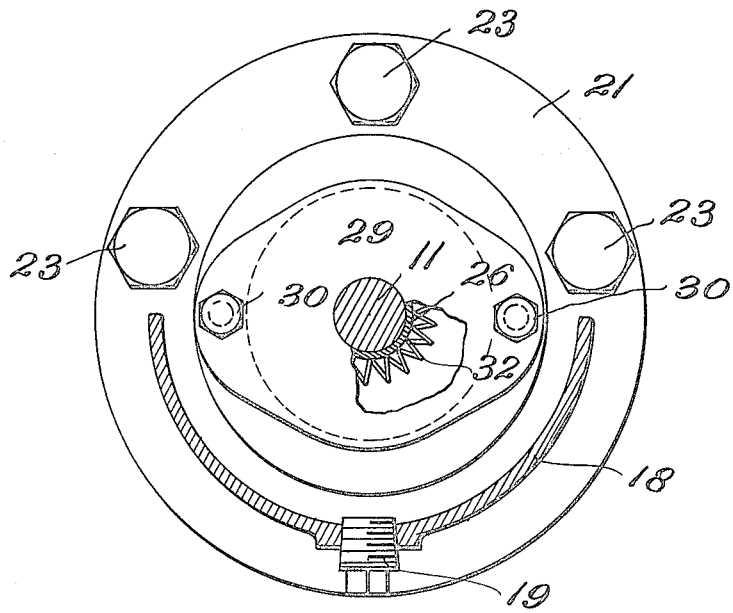
Figure 3:
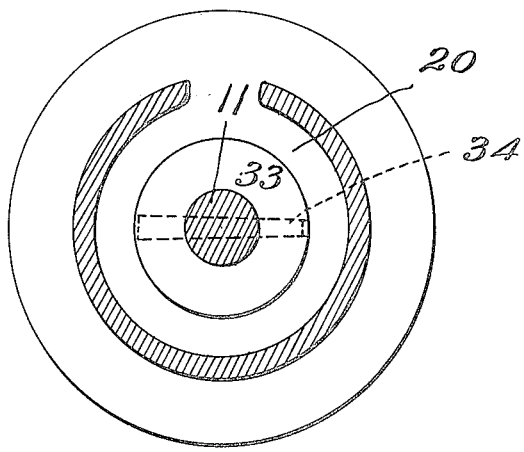
Figure 4:
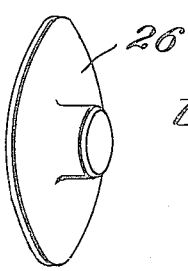

My invention is illustrated in a preferred form in the accompanying drawings wherein Figure 1 is a vertical longitudinal sectional view of the device; Figure 2 is a vertical transverse sectional view on the line 2—2 of Figure 1; the same being shown partly broken away; Figure 3 is a similar view on the line 3—3 of Figure 1; and Figure 4 is a perspective view of a flanged leather packing ring.

At 10 is shown the outer wall of the container, the inner side being on the right in Figure 1. The power is transmitted by the shaft section 11, which is guided and supported in the bearings 12 and 13, and passes through the stuffing box hereinafter described.

The stuffing box is carried in a chamber 14 to which the bearings 12 and 13 are fixed on opposite sides, whether all in one piece, as shown, or otherwise.

The outer bearing 12 has a lubricant space 15 to which the lubricant is admitted by the opening 16, and lubricant is admitted to the inner bearing 13 by the opening 17. The outerbearing 12 is separated from the stuffing box chamber by the drip chamber 18 having a plug 19 for cleaning purposes; and the inner bearing is separated from the chamber 14 by the lubricant cup 20, the purpose of which is described hereinafter.

The chamber 18 serves the purpose of indicating the extent to which the lubricant has escaped past the stuffing box.

The chamber 14 is cylindrical in shape and fits tightly a corresponding opening in the wall 10. This chamber is provided with a flat ring-shaped flange 21, having a suitable recess for the packing 22, which is compressed under the flange by means of the screws 23. It will be seen that, by this arrangement the transmitting shaft, its bearings and the stuffing box can be very conveniently removed or replaced all together as one, in case that it is found necessary to overhaul or repair the same.

In order to avoid all side strains, and transmit only pure torque through the stuffing box, I transmit power to the shaft section 11 by means of a flexible joint, as 24, at one end, and I use a similar flexible joint 25 to take power off of the shaft from the opposite end. I may use joints of the well known Oldham type, but I do not limit myself to any particular form of joint in this connection.

The main stuffing box is formed as follows. Within the chamber 14, the transmitting shaft is passed through a series of cup leathers or flange packing rings 26, shown in perspective in Figure 4. The outer circular peripheries of these flanged rings fit tightly within the chamber 14, and in order to prevent all possibility of leakage around these peripheries, the outer edge of each cup leather is gripped between a ring-shaped washer 27 and an annular washer 28, the latter of which preferably fits snugly on the shaft 11. These are all tightly compressed once for all by the outer compression plate 29, which is forced home by the screws 30.

Complete tightness at the peripheries of the cup leathers is insured by providing each washer 27 with a circular recess within which is forced one or more resilient rings 31 or rubber or the like, made of such a size as to fill the recess and press outward against the chamber wall when compressed.

In order to insure permanent tight fitting of the cup leathers or flanged rings on the shaft, I use a helical spring 32, which surrounds the shaft on each ring 26, and contracts so as to press said flange into firm contact with the shaft, thus preventing looseness due to wear.

In order effectually to prevent all leakage of gas or air from within, an important feature of my stuffing box is comprised in means for interposing a body of lubricant which is slowly forced outward through any minute space which may exist. This body of lubricant is held in the interior cup 20 and is supplied thereto by any desired means, through the pipe 39. The lubricant overflows from the cup and can be pumped back into it to provide continuous circulation.

In order to permit the stuffing box to be opened from the exterior for inspection and repair, while preserving the seal, I prefer to employ the ring 33, fixed on the shaft by the pin 34, which ring is preferably faced on both flat sides with leather, or other suitable material, as at 35, 36. In order to hold this ring to its seat, as well as to press the transmission shaft outward toward the exterior bearing, I prefer to employ a spiral spring 37, within the cup 20, with one end pressing against the ring 33 or its facing 36, while the other presses against the inside of the cup. At this latter point I prefer to use another cup leather 38 to prevent escape of lubricant. The ring 33 and its spring serve as an auxiliary stuffing box, permitting the main stuffing box to be opened from without.

Where the interior of the casing 10 is under a considerable fluid pressure, a certain small amount of lubricant will be forced outward through the stuffing box, as above described, and this is caught in the drip cup compartment 18. In the form of my invention illustrated, one member 25 of the internal flexible coupling is loosely fastened to the shaft by the screw 40, and is made small enough to be drawn out with the shaft, when it is desired to overhaul or dismantle the device.

Various changes may be made in my device without departing from the scope of my invention, and I do not limit myself to the details herein shown and described.

What I claim is:—

1. Means for transmitting power through a wall, comprising a shaft section passing through the wall, a stuffing box at the point of passage, a bearing for said shaft section at each extremity thereof, and a flexible coupling at each end of the shaft section immediately adjacent to the bearings, adapted to impart rotary motion without transmitting longitudinal and lateral thrusts to the shaft section.

2. Means for transmitting power through a wall, comprising a shaft section passing through the wall, a stuffing box at the point of passage on one side of the wall, an auxiliary stuffing box on the opposite side of the wall, whose pressure member is adapted to operate independently of the pressure member of said first named stuffing box, a bearing at each end of said shaft section and a flexible coupling at each end of said shaft section immediately adjacent to said bearings.

3. Means for transmitting power through a wall having a higher fluid pressure upon one side than the other, comprising a short shaft section passing through the wall, a stuffing box on the low pressure side of the wall, a lubricant cup applied to the shaft on the high pressure side of the wall, a ring surrounding the shaft section within said cup, whereby the sealing of the opening for the shaft is perfected by the slow forcing of lubricant outward by the superior fluid pressure.

4. A support for a transmission shaft, adapted to fit the same to a wall having an opening, said support comprising a main stuffing box chamber fitting said opening and having fastening means, an auxiliary stuffing box chamber and a bearing for the shaft on one side of said first named chamber, and a drip cup and bearing for the shaft on the opposite side of said chamber.

5. In a stuffing box for a rotary shaft, a series of flange packings fitting said shaft, and a tight spring over the flange of each packing, adapted to exert a radial pressure forcing each flange toward the axis of the shaft.

6. In a stuffing box for a rotary shaft a series of flange packings fitting said shaft, a spring over the flange of each packing adapted to compress each flange thereof against the shaft, compression pieces between the flange packings, means for squeezing the whole together longitudinally, and resilient rings in recesses at the peripheries of the compression pieces adapted to exert outward pressure when compressed.

7. An auxiliary stuffing box for a shaft comprising a lubricant cup surrounding the shaft, a ring fixed to the shaft and adapted to bear in a longitudinal direction against the stationary part of the stuffing box so as to make an approximately tight joint, a spring within the cup adapted to press said ring against said stationary part, and means for supplying lubricant to the cup.

8. Means for transmitting power through a wall having a higher fluid pressure on one side than the other comprising a shaft section passing through the wall, a packing box on the low pressure side of the wall and a lubricant cup on the other side of the wall adapted to hold a body of lubricant against the shaft where it passes through the wall, thus creating a seal by slow forcing of the lubricant through the joint.

9. Means of the character set forth generally in claim 8 hereof, in combination with means for supplying lubricant to said cup.

10. Means of the character set forth generally in claim 8 hereof, in combination with a drip cup outside of the packing box adapted to catch the lubricant passing through and thus serve as an indicator of the amount of lubricant so passing.

In testimony whereof, I affix my signature.
ROBERT F. MASSA.